US009077686B2

(12) United States Patent
Kumar et al.

(10) Patent No.: US 9,077,686 B2
(45) Date of Patent: Jul. 7, 2015

(54) TECHNIQUES FOR SECURE TRANSPARENT SWITCHING BETWEEN MODES OF A VIRTUAL PRIVATE NETWORK (VPN)

(75) Inventors: Chendil Kumar, Bangalore (IN); Gautham Chambrakana Ananda, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 91 days.

(21) Appl. No.: 13/046,897

(22) Filed: Mar. 14, 2011

(65) Prior Publication Data

US 2011/0167480 A1 Jul. 7, 2011

Related U.S. Application Data (63) Continuation of application No. 12/035,640, filed on Feb. 22, 2008, now Pat. No. 7,930,732.

(51) Int. Cl.
*H04L 29/06* (2006.01)

(52) U.S. Cl.
CPC ............. *H04L 63/0272* (2013.01); *H04L 63/00* (2013.01); *H04L 63/105* (2013.01); *H04L 63/20* (2013.01); *H04L 63/102* (2013.01)

(58) Field of Classification Search
CPC .................................................. H04L 63/0272
USPC ........................................ 726/4, 15; 709/227
See application file for complete search history.

(56) References Cited

U.S. PATENT DOCUMENTS

| 5,808,751 A | 9/1998 | Hochman |
| 6,704,282 B1 | 3/2004 | Darvwalla et al. |
| 6,816,462 B1 | 11/2004 | Booth, III et al. |
| 6,874,089 B2 | 3/2005 | Dick et al. |
| 7,114,177 B2 | 9/2006 | Rosenberg et al. |
| 7,426,642 B2 * | 9/2008 | Aupperle et al. ............. 713/185 |
| 7,555,783 B2 | 6/2009 | Enright |
| 7,568,217 B1 * | 7/2009 | Prasad et al. ....................... 726/3 |
| 7,583,667 B2 | 9/2009 | Adhikari et al. |
| 7,590,705 B2 | 9/2009 | Mathew et al. |
| 7,631,059 B2 | 12/2009 | Chang et al. |
| 7,665,132 B2 * | 2/2010 | Hisada et al. .................... 726/15 |
| 7,707,618 B1 * | 4/2010 | Cox et al. .......................... 726/1 |
| 7,734,792 B2 | 6/2010 | Kumar et al. |
| 7,930,732 B2 | 4/2011 | Kumar et al. |
| 2002/0199119 A1 * | 12/2002 | Dunnion et al. .............. 713/201 |

(Continued)

OTHER PUBLICATIONS

WatchGuard® Firebox® SSL VPN Gateway Administration Guide, Copyright© 2006, WatchGuard Technologies, Inc., retreived from http://www.watchguard.com/help/docs/v50FireboxSSLVPNGatewayAdminGuide.pdf on Oct. 1, 2012.*

(Continued)

*Primary Examiner* — Carl Colin
*Assistant Examiner* — Gary Lavelle
(74) *Attorney, Agent, or Firm* — Kilpatrick Townsend & Stockton LLP (57) ABSTRACT

Techniques for secure transparent switching between modes of a virtual private network (VPN) are provided. A principal, via a client, establishes a VPN session in a first mode of operation with a server. The principal subsequently requests a second mode of operation during the same VPN session. The VPN session is transparently transitioned to the second mode of operation without any interaction being required on the part of the principal and without terminating the original VPN session.

24 Claims, 3 Drawing Sheets

(56) References Cited

U.S. PATENT DOCUMENTS

| | | |
|---|---|---|
| 2004/0120328 A1 | 6/2004 | Adrangi et al. |
| 2004/0225895 A1 | 11/2004 | Mukherjee et al. |
| 2004/0260707 A1 | 12/2004 | Yang et al. |
| 2005/0081026 A1 | 4/2005 | Thornton et al. |
| 2005/0091540 A1 | 4/2005 | Dick et al. |
| 2006/0068785 A1 | 3/2006 | Kamijo et al. |
| 2006/0212934 A1* | 9/2006 | Cameron et al. ............ 726/12 |
| 2007/0061887 A1* | 3/2007 | Hoover et al. ............ 726/26 |
| 2008/0120711 A1* | 5/2008 | Dispensa ............ 726/7 |
| 2009/0204420 A1 | 8/2009 | Ganz |
| 2009/0217358 A1 | 8/2009 | Kumar et al. |
| 2010/0132032 A1 | 5/2010 | Vanover et al. |
| 2010/0153704 A1 | 6/2010 | Winslow |
| 2011/0007705 A1 | 1/2011 | Buddhikot et al. |

OTHER PUBLICATIONS

U.S. Appl. No. 12/035,640, filed Feb. 22, 2008, Notice of Allowance mailed Feb. 11, 2011, 27 pages.

* cited by examiner

TECHNIQUES FOR SECURE TRANSPARENT SWITCHING BETWEEN MODES OF A VIRTUAL PRIVATE NETWORK (VPN)

This application is a continuation of U.S. patent application Ser. No. 12/035,640, filed on Feb. 22, 2008 now U.S. Pat. No. 7,930,732, which is incorporated herein by reference in its entirety.

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One ever present and daunting issue with this activity is Internet security. Some transactions may be innocuous and may not require any substantial security. However, a growing number of transactions do involve sensitive material associated with enterprises and individuals, such as corporate secrets, personal data, etc. A variety of security mechanisms exist to address this issue.

For example, some enterprises may install dedicated connections for secure communications between parties. Yet, this approach is less pervasive with the advent of Virtual Private Network (VPN) techniques. A VPN permits an insecure connection to be used to achieve secure communications between parties engaged in a transaction.

VPN transactions use authentication and encryption techniques for purposes of ensuring that communications are secure. Essentially, a VPN permits insecure communications lines to be used in a secure manner.

Furthermore, there can be different modes of access for a VPN. For example, limited capabilities may require less authentication of a user than full capabilities would require. When a user is accessing a VPN via a limited capability mode and then desires to switch to a more robust full capability mode, the user has to terminate the VPN session and manually initiate a second VPN session. This is inconvenient and time consuming.

Consequently, there is a need for improved techniques for transparently switching between different modes of a VPN.

SUMMARY

In various embodiments, techniques for secure transparent switching between modes of a virtual private network (VPN) are provided. In an embodiment, a method for dynamically switching between different modes of a VPN is presented. More specifically, a Secure Sockets Layer (SSL) Virtual Private Network (VPN) session is established between a client and a server for a first mode of access. A request is received from a principal of the client to switch from the first mode of access to a second mode of access. The second mode of access includes additional security permissions from what is associated with the first mode of access. Verification is made to ensure that the principal has root or administrative privileges on the client when the request was made to switch from the first mode to the second mode. The SSL VPN session is reconfigured from the first mode to the second mode when the principal is determined to have root or administrative privileges on the client. The reconfiguring occurs without disconnecting the SSL VPN session. Finally, the SSL VPN session is continued in the second mode of access, without manually requiring the principal to re-authenticate for the additional security permissions associated with the second mode.

DETAILED DESCRIPTION

A "resource" includes a user, content, a processing device, a node, a service, an application, a system, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

A "virtual private network (VPN)" is a special type of network that is carved out of or tunneled through another network, such as an insecure network like the Internet. Technically, a VPN does not have to have security features it can be any sub network that tunnels out specific traffic. However, as used herein the VPN uses security features, such as authentication so that secure communications occur via a Secure Sockets Layer (SSL) VPN.

A "kiosk" mode of VPN access does not require root or administrative privileges on the client workstation associated with a SSL VPN session. In a kiosk mode of VPN access only a limited subset of applications are available to the client over the network and each of those applications have to be initiated with the initial configuration of the SSL VPN session to even be available to the client.

An "enterprise" mode of VPN access requires root or administrative privileges to initiate from the client, which is associated with the SSL VPN session. All applications of the server are enabled for access by the client in an enterprise mode of access regardless of whether they were opened before or after the client initially establishes the VPN session. Again, with enterprise mode all applications including remote desktop applications and toolbar applications are SSL enabled over the SSL VPN session.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
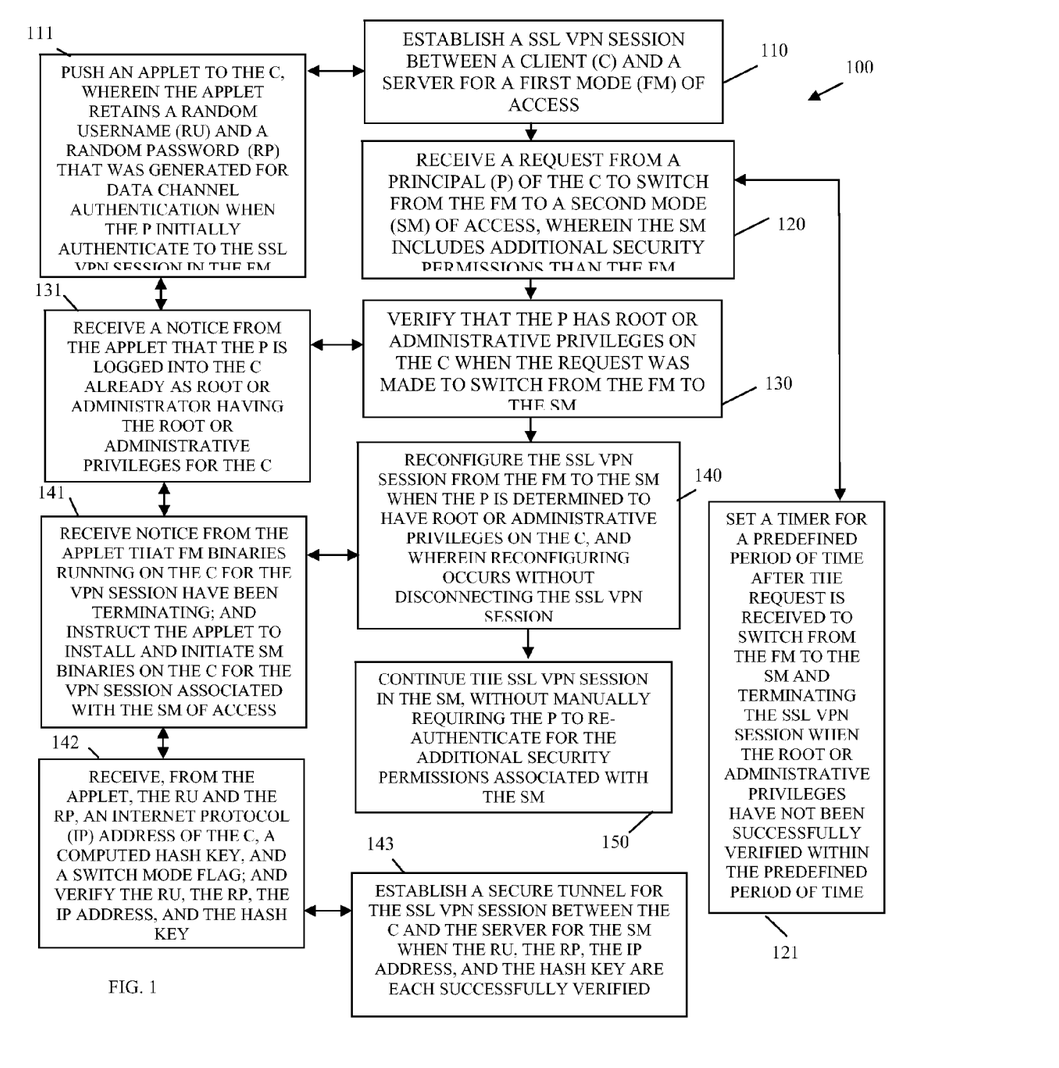
FIG. 1 is a diagram of a method for dynamically switching between different modes of a virtual private network (VPN), according to an example embodiment.

FIG. 1 is a diagram of a method 100 for dynamically switching between different modes of a VPN, according to an example embodiment. The method 100 (hereinafter "SSL VPN switching service") is implemented as instructions in a machine-accessible and readable medium. The instructions when executed by a machine (computer or processor-enabled device) perform the processing depicted in FIG. 1. The SSL VPN switching service is also operational over and processes within a network. The network may be wired, wireless, or a combination of wired and wireless. In an embodiment, the network is the Internet.

At 110, the SSL VPN switching service establishes a SSL VPN session between a client and a server for a first mode of access. A principal interacts with a client to initially authenticate and create the SSL VPN session between the client and the principal.

As an example mechanism for initially establishing the SSL VPN session consider the following scenario, where the principal is a user and the server includes corporate network resources that the user desires to access. So, a user desires VPN access to corporate network resources. He/She accesses a Uniform Resource Locator (URL) Link, which points to a web server. A login prompt is thrown up in the user's browser requesting that the user to authenticate. The user receives a web page for entering his/her credentials. The user credentials are sent to web server for authentication. The web server verifies the user's credentials against the user identity store. If valid credentials were provided, the web server passes two random cookies to connection manager to store in a connection manager table. The connection manager generates a random username and password based on these cookies, for data channel authentication. Next, the connection manager passes this random username and password to server applet, which is then downloaded by an Applet/ActiveX module. The Applet/ActiveX module verifies if the user has Administrator privileges in the system. If the user does have administrative privileges, then enterprise mode binaries are downloaded; otherwise kiosk mode binaries are downloaded. Based on the role of the user, a set of policies are sent to the client. This determines what applications are accessible for the user. Based on the mode of access, the Applet/ActiveX module gives the random cookies to the corresponding client daemons for enterprise mode or kiosk mode. When the Client daemon tries to connect to the server daemon with the random username and password, server daemon contacts the connection manager to verify the credentials. The connection manager then sees this information via a connection manager table in an uninitialized state and accepts the connection and updates the state to be connected in the table. Any one trying to connect again with the same username and password is denied or rejected since the state is connected for this random username and password. Once the authentication is complete between the client and server daemon, both proceed to exchange set of keys and algorithms to establish the SSL tunnel.

So, at 111, the SSL VPN switching service pushes an applet or ActiveX module to the client. The applet retains a random username and a random password that was generated for data channel authentication when the principal was initially authenticated to the SSL VPN session in the first mode.

For the SSL VPN session there are two communication channels, a control channel and a data channel. The control channel is responsible for downloading binaries, such as binaries to keep the session alive, and the control channel is responsible for downloading the random username and password from the server for data channel authentication, statistics of the client, etc. The data channel is formed using credentials downloaded from control channel. It is responsible for the actual SSL VPN connection and packet transmission.

At 120, the SSL VPN switching service receives a request at some point after the SSL VPN is established and is processing in the first mode. The request is received from the principal of the client and it is for switching from the first mode to a second mode of access within the SSL VPN session. The second mode of access includes additional security permissions from that which is associated with the first mode of access. In a conventional scenario, for a switch to occur the SSL VPN session has to be terminated and entirely new SSL VPN session established for the increased security or access permissions associated with the second mode of access. With the teachings presented herein, the SSL VPN session is not terminated rather it is dynamically and at run time transitioned from the first mode of access to the second mode of access in a manner that is entirely transparent and unknown to the principal.

In some cases, at 121, the SSL VPN switching service sets a time for a predefined period of time after the request is received to switch from the first mode of access to the second mode of access. The SSL VPN session is terminated when root or administrative privileges have not or can not be successfully verified within the predefined period of time.

At 130, the SSL VPN switching service verifies that the principal has root or administrative privileges on the client when the request was made to switch from the first mode to the second mode.

In an embodiment, at 131, the SSL VPN switching service receives a notice from the applet (discussed at 111) indicating that the principal is logged into the client already as root or administrator and has the root or administrative privileges for the client machine. So, the applet communicates back to the SSL VPN switching service to verify that the principal has root or administrative privileges on the client.

At 140, the SSL VPN switching service reconfigures the SSL VPN session from the first mode to the second mode when the principal is in fact determined to have root or administrative privileges on the client. The reconfiguration occurs without disconnecting the SSL VPN session.

In an embodiment, at 141, the SSL VPN switching service receives notice from the applet that first mode binaries running on the client for the SSL VPN session have been terminated and removed from the client by the applet. The SSL VPN switching service then instructs the applet to install and initiate second mode binaries on the client for the SSL VPN session, the second mode binaries associated with the second mode of access.

In another situation, at 142, the SSL VPN switching service receives from the applet the randomly generated username and randomly generated password (discussed at 110), and an Internet Protocol (IP) address of the client, a computer hash key, and a switch mode flag. Next, the SSL VPN switching service verifies all this information to ensure that authentication to transition from the first mode to the second mode is appropriate. The applet originally received the randomly generated username, randomly generated password, IP address, hash key, and switch mode at 110 and 111. Moreover, additional details on how the hash key is generated are provided in detail below in the example scenario that follows the discussion of the FIG. 2.

At 143, the SSL VPN switching service then establishes a secure tunnel for the SSL VPN session between the client and the server for the second mode when the randomly generated username, randomly generated password, the IP address of the client, and the hash key are each and all collectively verified. A sample illustration below is provided that demonstrates how the SSL VPN switching service performs verification before switching to the second mode. This is provided in detail below in the example scenario that follows the discussion of the FIG. 2.

At this point, at 150, the SSL VPN switching service continues the SSL VPN session in the second mode. This is done without manually requiring the principal to re-authenticate for the additional security permissions and additional resources, which are now available in the second mode of access.

The principal initially created a limited SSL VPN session with limited resources being available from the server and transparently reconfigured that SSL VPN session, without terminate it, to a second mode of access having increased resource availability and which typically would have required additional authentication on the part of the principal. This is done in a manner that is transparent to the principal via the SSL VPN switching service.

Figure 2:
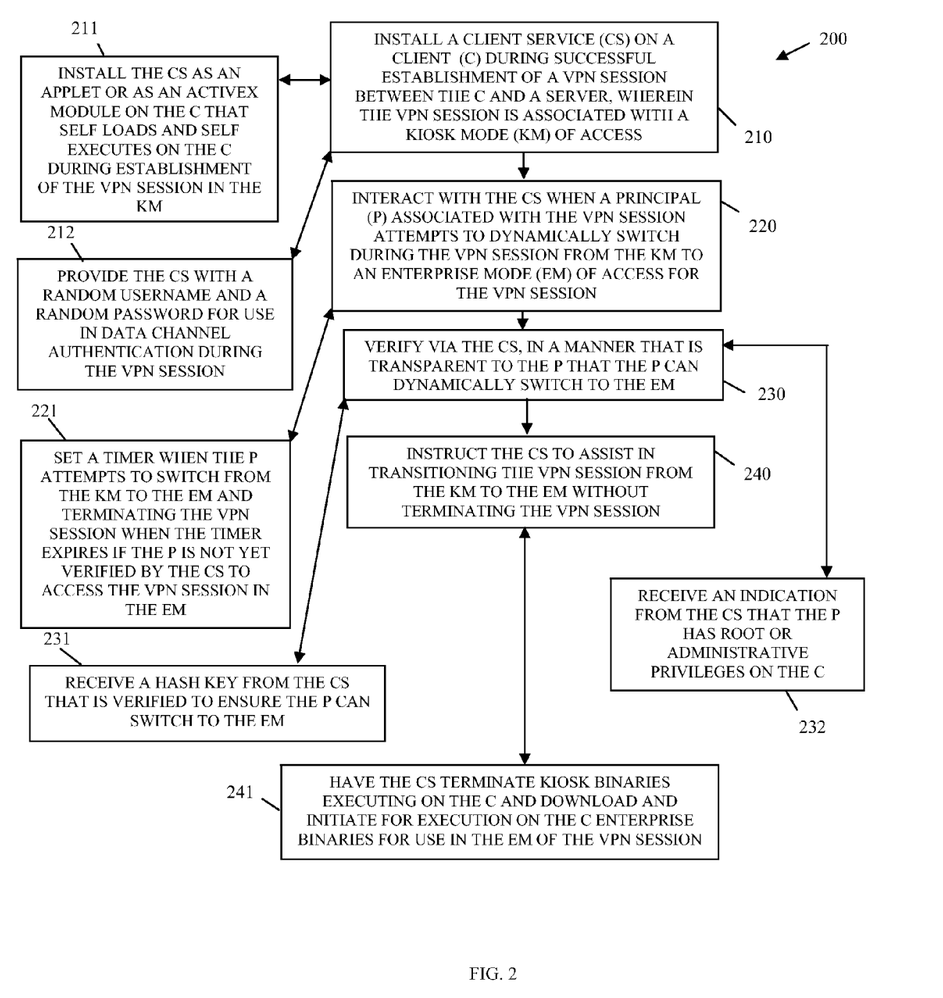
FIG. 2 is a diagram of another method for dynamically switching between different modes of a VPN, according to an example embodiment.

FIG. 2 is a diagram of another method 200 for dynamically switching between different modes of a VPN, according to an example embodiment. The method 200 (hereinafter "transparent VPN switching service") is implemented in a machine-accessible and readable medium as instructions. The instructions when executed by a machine perform the processing depicted in the FIG. 2. Moreover, the transparent VPN switching service is operational over a network, and the network may be wired, wireless, or a combination of wired and wireless.

In an embodiment, the transparent VPN switching service presents an alternative and in some cases enhanced perspective to the SSL VPN switching service discussed in detail above with reference to the method 100 of the FIG. 1.

At 210, the transparent VPN switching service installs a client service on a client during a successful establishment of a VPN session between the client and a server. The VPN session is associated with a kiosk mode of access.

Again, with kiosk mode a user is without administrator rights or root privileges on the server for which the VPN session established. The user is just eligible to access the SSL VPN session via kiosk mode for now. When the user connects to SSL VPN session in kiosk mode, applications that were opened before the SSL VPN connection was established are not enabled for SSL VPN session access. It has application layer components, which hooks with each application that runs after the VPN session establishment. So after hooking all the packets sent by the application are received by the client and sent to server.

In an embodiment, at 211, the transparent VPN switching service installs the client service as an applet or an ActiveX module on the client that self loads and self executes on the client during the establishment of the VPN session in the kiosk mode.

According to an embodiment, at 212, the transparent VPN switching service provides the client service with a randomly generated username and a randomly generated password for use in data channel authentication during the VPN session for later switching to an enterprise mode of access (discussed below).

At 220, the transparent VPN switching service interacts with the client service when the principal, who is associated with the VPN session, dynamically attempts to switch from the kiosk mode of access to an enterprise mode of access for the same VPN session that was established in kiosk mode at 210.

In an embodiment, the transparent VPN switching service sets a timer when the principal attempts to switch from the kiosk mode to the enterprise mode. Moreover, the transparent VPN switching service terminates the VPN session when the timer expires and if the principal is not yet verified by the client service to access the VPN session. This prevents hackers from trying to hijack to the switched session.

At 230, the transparent VPN switching service verifies, via the client service, in a manner that is transparent to the principal, that the principal can dynamically switch to the enterprise mode during the same VPN session established in kiosk mode at 210.

Again, with enterprise mode the principal (user) can connect to SSL VPN session in enterprise mode only if the user has administrator or root privileges on the server or if the client had pre-installed the SSL VPN client components on the client. Enterprise mode has one kernel layer component, which is a virtual driver and one application layer component. The client service needs admin/root credentials to configure the virtual interface. Then, packets from the applications run by the user are received by the client service from this virtual interface, which is encrypted and sent to the server.

In an embodiment, at 231, the transparent VPN switching service receives a hash key from the client service, which is then verified to ensure that the principal can switch to the enterprise. This is discussed below in the example illustration that follows the discussion of the FIG. 2. Other parameters may also be received and used, such as a randomly generated username, a randomly generated password, and a switch flag are used to perform data channel authentication. Again, these are discussed in detail below with the example illustration that follows the discussion of the FIG. 2.

According to an embodiment, at 232, the transparent VPN switching service receives an indication from the client service that the principal has root or administrative privileges on the client. This is an indication to the transparent VPN switching service that the principal can permissible dynamically switch from the kiosk mode to the enterprise mode during the same VPN session.

At 140, the transparent VPN switching service instructs the client service to assist in transitioning the VPN session from the kiosk mode to the enterprise mode without terminating the VPN session.

In an embodiment, at 141, the transparent VPN switching service has the client service terminate kiosk binaries on the client and then download and initiate for execution on the client enterprise binaries for use in the enterprise mode of the VPN session.

An example scenario is now presented to illustrate in an example implementation as to how the transparent VPN switching service performs dynamic switching from a kiosk mode to an enterprise mode without requiring action of the user and without terminating an existing VPN session.

Initially, a user is connected to a VPN Gateway in kiosk mode. He/She wants switch to the enterprise mode without disconnecting the VPN Session to get access to additional network resources available with the enterprise mode but not available with the existing kiosk mode. Present day convention is that the user has to logout of the existing VPN session, and then authenticates to a user identity store and provides administrator username/password of the machine to establish the tunnel in the desired enterprise mode. With the transparent VPN switching service the user need not authenticate to the user identity store a second time, just the administrator username and password of the workstation/client of the user is sufficient. An applet/ActiveX module (client service) has the username and password for the present kiosk mode of the VPN session and for data channel authentication. The user will press a button or makes a request to switch to the Enterprise mode. The applet/ActiveX module checks to see if the user has a valid administrator username/password of the workstation. After obtaining the username/password of the workstation the applet/ActiveX module sends a message to transparent VPN switching service for mode change through a control channel (discussed above).

The transparent VPN switching service further sends a message to a VPN connection manager to change the mode of the VPN session to a switching mode for transitioning to the enterprise mode.

The transparent VPN switching service receives a pseudo random number as acknowledgment from VPN connection manager after changing the state, and sends a command to the applet/ActiveX module to kill all the processes of kiosk mode and uninstall the related binaries on the client. Accordingly, the applet/ActiveX module kills all the processes of Kiosk mode and binaries are uninstalled. Then the applet/ActiveX module sends an acknowledgment to the transparent VPN switching service. The transparent VPN switching service sends the enterprise mode binaries to the client. The client receives the binaries and installs them on the client.

A hash key is then computed by the client daemon or the applet based on username, password, (two random numbers sent by VPN connection manager through the transparent VPN switching service initially during kiosk mode session), client IP address, pseudo random number passed by the VPN connection manager to applet/ActiveX module, and a switch number, which is hardcoded in the client and which is only known to the client.

Now the Client daemon or applet of the enterprise mode uses the same username and password that kiosk mode components used to establish the tunnel, it will also send the client IP, Computed Hash and the Switch flag.

The transparent VPN switching service receives the same and then sends it to VPN connection manager for authentication. The VPN connection manager also computes the hash key and verifies it via a connection table for the client IP, username, password and the mode (switching). If all these match, the VPN connection manager sends a success message to the transparent VPN switching service.

The transparent VPN switching service proceeds further to establish the tunnel. After the tunnel is established the transparent VPN switching service sends a message to VPN connection manager for successful tunnel establishment. The VPN connection manager then changes the mode of the current VPN session to enterprise mode. Hence the transparent switch is achieved without requesting the user to authenticate to the user identity store and without ever terminating the initial VPN session, which was initially established in kiosk mode.

Figure 3:
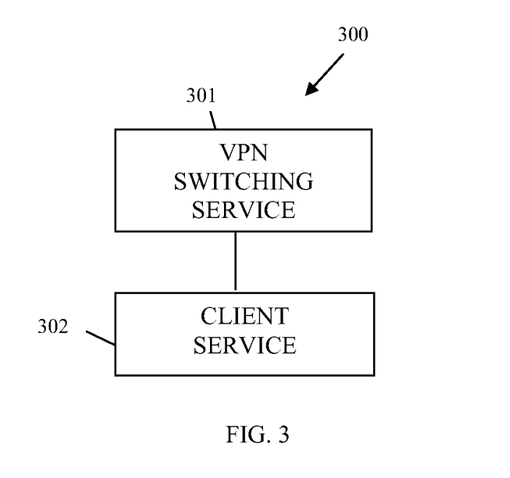
FIG. 3 is a diagram of VPN mode switching system, according to an example embodiment.

FIG. 3 is a diagram of VPN mode switching system 300, according to an example embodiment. The VPN mode switching system 300 is implemented in a machine-accessible and readable medium as instructions. The instructions when executed by a machine perform, among other things, the processing depicted in the methods 100 and 200 of the FIGS. 1 and 2, respectively. Moreover, the VPN mode switching system 300 is operational over a network, and the network may be wired, wireless, or a combination of wired and wireless.

The VPN mode switching system 300 includes a VPN switching service 301 and a client service 302. Each of these will now be discussed in turn.

The VPN switching service 301 is implemented in a machine-accessible and computer-readable medium as instructions that execute on a server machine of a network. Example processing associated with the VPN switching service 301 was discussed in detail above with reference to the methods 100 and 200 of the FIGS. 1 and 2, respectively.

The VPN switching service 301 dynamically installs and initiates the client service 302 on the client machine when a VPN session is established for a principal with a target machine over the network. The VPN session is initially configured for a first mode of access.

In an embodiment, the first mode is a kiosk mode and the second mode is an enterprise. Each of which was discussed in detail above with reference to the methods 100 and 200 of the FIGS. 1 and 2, respectively.

According to an embodiment, the VPN switching service 301 generates and provides to the client service 302 a randomly generated username and randomly generated password for use in data channel authentication during the VPN session.

In a particular situation, the VPN session is a SSL VPN session.

The VPN switching service 301 ensures that when a request to switch to the second mode is received during the VPN session that the request is authenticated within a configurable period of time and when it is not authenticated within the configurable period of time, the VPN session is terminated.

In an embodiment, the second mode has less security rights to resources of the target machine than the first mode, such as when the initial VPN session is an enterprise mode and the switch occurs to a kiosk mode. In other cases (discussed in detail above), the second mode has increased security rights to resources of the target machine than that which is associated with the first mode, such as when the first mode is the kiosk mode and the second mode is then enterprise mode (again discussed at length herein and above). So, the dynamic switching can occur to decrease security access rights or increase security access rights during the VPN session and without terminating the VPN session.

The client service 302 is implemented in a machine-accessible and computer readable medium as instructions that execute on a client machine of the network. Example processing associated with the client service 302 was discussed in detail above with reference to the methods 100 and 200 of the FIGS. 1 and 2, respectively.

The VPN switching service 301 initially installs and causes to execute the client service 302 on the client machine when the VPN session is established. The client service 302 and the VPN switching service 301 cooperate with one another to ensure data channel authentication and to dynamically switch the VPN session from the first mode to a second different mode of access, without terminating the VPN session and without requiring any additional manual authentication on the part of a user or principal associated with the VPN session. The cooperation and actions associated with doing this were discussed in detail above with reference to the methods 100 and 200 of the FIGS. 1 and 2.

Figure 4:
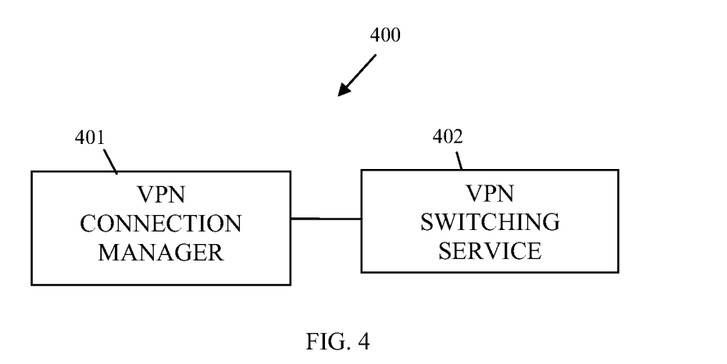
FIG. 4 is a diagram of another VPN mode switching system, according to an example embodiment.

FIG. 4 is a diagram of another VPN mode switching system 400, according to an example embodiment. The VPN mode switching system 400 is implemented as instructions on or within a machine-accessible and readable medium. The instructions when executed by one or more machines perform, among other things, processing depicted with respect to the methods 100, 200 of the FIGS. 1-2, respectively. The VPN mode switching system 400 is also operational over a network, and the network may be wired, wireless, or a combination of wired and wireless.

In an embodiment, the VPN mode switching system 400 presents an alternative and in some cases enhanced perspective of the VPN mode switching system 300 represented by the FIG. 3 above.

The VPN mode switching system 400 includes a VPN connection manager 401 and a VPN switching service 402. Each of these and their interactions with one another will now be discussed in turn.

The VPN connection manager 401 is implemented in a machine-accessible and computer-readable medium as instructions that process on a machine (computer or processor-enabled device) of a network.

The VPN connection manager 401 supplies dynamic data channel authentication for establishing a kiosk mode of operation for a VPN session and for establishing an enterprise mode of operation for the same VPN session. The VPN connection manager 401 interacts with the VPN switching service 402 to provide the dynamic data channel authentication during a dynamic switch from kiosk mode to enterprise mode.

According to an embodiment, the VPN connection manager 401 supplies a randomly generated username and a randomly generated password when the VPN session is initially established for the principal in the kiosk mode.

In an embodiment, the VPN connection manager 401 retains session information for the VPN session and clears the session information when a request to switch to the enterprise mode is received from the VPN switching service and when proper authentication of the principal is not received within a preset period of time. The preset period of time can be a configured processing parameter associated with the system 400. Alternatively, the preset period of time can be dynamically supplied based on policy evaluation.

The VPN connection manager 401 interacts with the VPN switching service 402 to determine when the principal, who is associated with the kiosk mode of the VPN session, can be dynamically transitioned to the enterprise mode for the same VPN session. The switching occurs without terminating the VPN session and in a manner that is entirely transparent to the principal.

The VPN switching service 402 is implemented in a machine-accessible and computer-readable medium as instructions that process on the same machine as the VPN connection manager 401 or an entirely different machine of the network. Example processing associated with the VPN switching service 402 was provided above with the methods 100 and 200 of the FIGS. 1 and 2, respectively and with the system 300 of the FIG. 3.

The VPN switching service 402 uses the VPN connection manager 401 to interact with a client service, which is installed as an applet on the client machine during initial VPN session establishment in kiosk mode, for purposes of dynamically authenticating a principal for transitioning during the same VPN session from a kiosk mode of operation to an enterprise mode of operation.

The VPN switching service 402 resupplies the randomly generated username and the randomly generated password along with a hash key that incorporates other factors to the VPN connection manager 401 when switching to the enterprise mode for the VPN connection manager 401 to verify before switching to the enterprise mode proceeds for the principal during the same VPN session. The example illustration that follows the discussion of the FIG. 2 provided an in detail technique for the VPN connection manager 401 to us for performing verification before switching takes place.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for dynamically switching access modes during a communication session, the method comprising:
 establishing, by a processor-enabled device a Secure Socket Layer (SSL) Virtual Private Network (VPN) connection between a client and a server, the SSL VPN providing one or more secure communication channels over an insecure network;
 pushing, by the processor-enabled device, a first applet to the client for managing the SSL VPN connection, the first applet retaining a random username and a random password generated by the processor-enabled device based on one or more cookies received from the client and permitting a first mode of security during the SSL VPN connection between the client and the server, the first mode of security providing access to resources in the established SSL VPN connection between the client and the server based on an authorization of the user of the client;

receiving, by the processor enabled device, a request from the client to switch to a second mode of security during the SSL VPN connection between the client and the server and after providing access to resources to the client in the first mode of security, the second mode of security providing greater access to resources in the established session between the client and the server than the first mode of security;

validating, by the processor enabled device and based on said validating, that the user of the client is authorized for the second mode of security;

instructing, by the processor enabled device, the client to uninstall the first applet and install the second applet that supports the second mode of security;

receiving, by the processor enabled device from the client, the random username and random password;

verifying, by the processor enabled device, the random username and random password received from the client; and establishing, by the processor enabled device with the client, a secure tunnel for the established SSL VPN connection in response to verifying the random username and random password received from the client, wherein interacting between the client and the server in the established SSL VPN connection continues in the second mode of security using the second applet and without terminating the SSL VPN connection between the client and the server.

2. The method of claim 1, wherein pushing further includes embedding credentials in the first applet for the client to use during the SSL VPN connection with the server while in the first mode of security.

3. The method of claim 1, wherein instructing further includes pushing the second applet to the client with credentials for the client to use during the SSL VPN connection with the server while in the second mode of security.

4. The method of claim 1 further comprising, setting, by the processor-enabled device, a timer for the client to switch from the first mode of security to the second mode of security and terminating the VPN connection when the timer expires and the client has not uninstalled the first applet and installed the second applet.

5. The method of claim 1, wherein establishing the SSL VPN connection further comprises, establishing and maintaining, by the processor-enabled device two communication channels with the client during the SSL VPN connection, wherein the first channel is a control channel and is used for downloading to the client the first applet and the second applet, and wherein the second channel is a data channel and is used for interacting between the client and the server during the VPN connection.

6. The method of claim 5, wherein maintaining further includes providing a first set of credentials for authentication during the first mode of security for the client to use over the data channel with the server and providing a second set of credentials for authentication during the second mode of security for the client to use over the data channel.

7. The method of claim 5, wherein said establishing the SSL VPN connection is performed using both the first communication channel and the second communication channel, wherein pushing the first applet to the client, receiving the request from the client to switch to the second mode of security, and instruction the client to uninstall the first applet and install the second applet are performed using the first communication channel, and wherein providing access to the resources to the client is performed using the second communication channel.

8. The method of claim 1, wherein instructing further includes providing, via the server, additional resources to the client via the second mode of security which were unavailable during the first mode of security.

9. A system comprising:
a processor; and
a memory coupled with and readable by the processor and having stored therein a set of instructions which, when executed by the processor, causes the processor to dynamically switch access modes during a communication session by:

establishing a Secure Socket Layer (SSL) Virtual Private Network (VPN) connection between a client and a server, the SSL VPN providing one or more secure communication channels over an insecure network;

pushing a first applet to the client for managing the SSL VPN connection, the first applet retaining a random username and a random password generated by the processor-enabled device based on one or more cookies received from the client and permitting a first mode of security during the SSL VPN connection between the client and the server, the first mode of security providing access to resources in the established SSL VPN connection between the client and the server based on an authorization of the user of the client;

receiving a request from the client to switch to a second mode of security during the SSL VPN connection between the client and the server and after providing access to resources to the client in the first mode of security, the second mode of security providing greater access to resources in the established session between the client and the server than the first mode of security;

validating based on said validating that the user of the client is authorized for the second mode of security;

instructing the client to uninstall the first applet and install a the second applet that supports the second mode of security;

receiving from the client the random username and random password;

verifying the random username and random password received from the client; and establishing with the client a secure tunnel for the established SSL VPN connection in response to verifying the random username and random password received from the client, wherein interacting between the client and the server in the established session continues in the second mode of security using the second applet and without terminating the SSL VPN connection between the client and the server.

10. The system of claim 9, wherein pushing further includes embedding credentials in the first applet for the client to use during the SSL VPN connection with the server while in the first mode of security.

11. The system of claim 9, wherein instructing further includes pushing the second applet to the client with credentials for the client to use during the SSL VPN connection with the server while in the second mode of security.

12. The system of claim 9, further comprising, setting, by the processor-enabled device, a timer for the client to switch from the first mode of security to the second mode of security and terminating the VPN connection when the timer expires and the client has not uninstalled the first applet and installed the second applet.

13. The system of claim 9, wherein establishing the SSL VPN connection further comprises, establishing and maintaining two communication channels with the client during the SSL VPN connection, wherein the first channel is a control channel and is used for downloading to the client the first applet and the second applet, and wherein the second channel is a data channel and is used for interacting between the client and the server during the VPN connection.

14. The system of claim 13, wherein maintaining further includes providing a first set of credentials for authentication during the first mode of security for the client to use over the data channel with the server and providing a second set of credentials for authentication during the second mode of security for the client to use over the data channel.

15. The system of claim 13, wherein said establishing the SSL VPN connection is performed using both the first communication channel and the second communication channel, wherein pushing the first applet to the client, receiving the request from the client to switch to the second mode of security, and instruction the client to uninstall the first applet and install the second applet are performed using the first communication channel, and wherein providing access to the resources to the client is performed using the second communication channel.

16. The system of claim 9, wherein instructing further includes providing additional resources to the client via the second mode of security which were unavailable during the first mode of security.

17. A computer-readable memory having stored therein a set of instructions which, when executed by a processor, causes the processor to dynamically switch access modes during a communication session by:
  establishing a Secure Socket Layer (SSL) Virtual Private Network (VPN) connection between a client and a server, the SSL VPN connection providing one or more secure communication channels over an insecure network;
  pushing a first applet to the client for managing the SSL VPN connection, the first applet retaining a random username and a random password generated by the processor-enabled device based on one or more cookies received from the client and permitting a first mode of security during the SSL VPN connection between the client and the server, the first mode of security providing access to resources in the established SSL VPN connection between the client and the server based on an authorization of the user of the client;
  receiving a request from the client to switch to a second mode of security during the SSL VPN connection between the client and the server and after providing access to resources to the client in the first mode of security, the second mode of security providing greater access to resources in the established session between the client and the server than the first mode of security;
  validating based on said validating that the user of the client is authorized for the second mode of security;
  instructing the client to uninstall the first applet and install a the second applet that supports the second mode of security;
  receiving from the client the random username and random password;
  verifying the random username and random password received from the client; and
  establishing with the client a secure tunnel for the established SSL VPN connection in response to verifying the random username and random password received from the client, wherein interacting between the client and the server in the established SSL VPN connection continues in the second mode of security using the second applet and without terminating the SSL VPN connection between the client and the server.

18. The computer-readable memory of claim 17, wherein pushing further includes embedding credentials in the first applet for the client to use during the SSL VPN connection with the server while in the first mode of security.

19. The computer-readable memory of claim 17, wherein instructing further includes pushing the second applet to the client with credentials for the client to use during the SSL VPN connection with the server while in the second mode of security.

20. The computer-readable memory of claim 17, further comprising, setting a timer for the client to switch from the first mode of security to the second mode of security and terminating the VPN connection when the timer expires and the client has not uninstalled the first applet and installed the second applet.

21. The computer-readable memory of claim 17, wherein establishing the SSL VPN connection further comprises, establishing and maintaining two communication channels with the client during the SSL VPN connection, wherein the first channel is a control channel and is used for downloading to the client the first applet and the second applet, and wherein the second channel is a data channel and is used for interacting between the client and the server during the VPN connection.

22. The computer-readable memory of claim 21, wherein maintaining further includes providing a first set of credentials for authentication during the first mode of security for the client to use over the data channel with the server and providing a second set of credentials for authentication during the second mode of security for the client to use over the data channel.

23. The computer-readable memory of claim 21, wherein said establishing the SSL VPN connection is performed using both the first communication channel and the second communication channel, wherein pushing the first applet to the client, receiving the request from the client to switch to the second mode of security, and instruction the client to uninstall the first applet and install the second applet are performed using the first communication channel, and wherein providing access to the resources to the client is performed using the second communication channel.

24. The computer-readable memory of claim 17, wherein instructing further includes providing additional resources to the client via the second mode of security which were unavailable during the first mode of security.

* * * * *

UNITED STATES PATENT AND TRADEMARK OFFICE
CERTIFICATE OF CORRECTION

PATENT NO.       : 9,077,686 B2                           Page 1 of 1
APPLICATION NO.  : 13/046897
DATED            : July 7, 2015
INVENTOR(S)      : Chendil Kumar et al.

It is certified that error appears in the above-identified patent and that said Letters Patent is hereby corrected as shown below:

Page 1, Other Publications:   Replace "retreived" with --retrieved--

Column 4, line 19:   Replace "Any one" with --Anyone--

Claim 9, column 12, line 44:   Replace "a the" with --a--

Claim 17, column 14, line 2:   Replace "a the" with --a--

Signed and Sealed this
Twelfth Day of July, 2016

Michelle K. Lee
*Director of the United States Patent and Trademark Office*